United States Patent [19]

Reneau

[11] Patent Number: 4,489,850
[45] Date of Patent: Dec. 25, 1984

[54] CLOSURE MEMBER FOR PRESSURE VESSEL

[75] Inventor: Raymond P. Reneau, Houston, Tex.

[73] Assignee: Reneau, Inc., Sugarland, Tex.

[21] Appl. No.: 498,838

[22] Filed: May 27, 1983

[51] Int. Cl.³ .............................................. B65D 45/28
[52] U.S. Cl. ..................... 220/323; 220/315; 292/37; 292/256.65
[58] Field of Search ................... 220/323, 315, 316, 3, 220/211; 292/3, 33, 37, 140, 157, 159, 265.5, 265.65, 257, 256.65

[56] References Cited

U.S. PATENT DOCUMENTS

| 997,793 | 7/1911 | Fish et al. ............................. 292/37 |
| 1,269,572 | 6/1918 | Allenbaugh ........................... 292/37 |
| 2,010,200 | 8/1935 | Rufener ................................. 220/57 |
| 2,196,895 | 4/1940 | Bowman ................................. 220/55 |
| 2,584,100 | 1/1952 | Uecker ....................... 292/256.65 X |
| 2,664,611 | 1/1954 | Shomber ................................ 24/211 |
| 3,258,151 | 6/1966 | Gasche ................................. 220/240 |
| 4,102,474 | 7/1978 | Platts .................................... 220/323 |
| 4,114,933 | 9/1978 | Jankelewitz ............................ 292/37 |
| 4,315,577 | 2/1982 | Bernson, Jr. ......................... 220/323 |
| 4,342,207 | 8/1982 | Holmes et al. ........................ 70/119 |

Primary Examiner—Steven M. Pollard
Attorney, Agent, or Firm—Glaser, Griggs & Schwartz

[57] ABSTRACT

A closure member for a pressure vessel having a ring assembly that has a radially expansible outside diameter and an inside diameter defining a central area, with the central area of the diameter greater than one-half the outside diameter, and with the ring assembly selectively engaging the pressure vessel between a locked position and an unlocked position.

15 Claims, 3 Drawing Figures

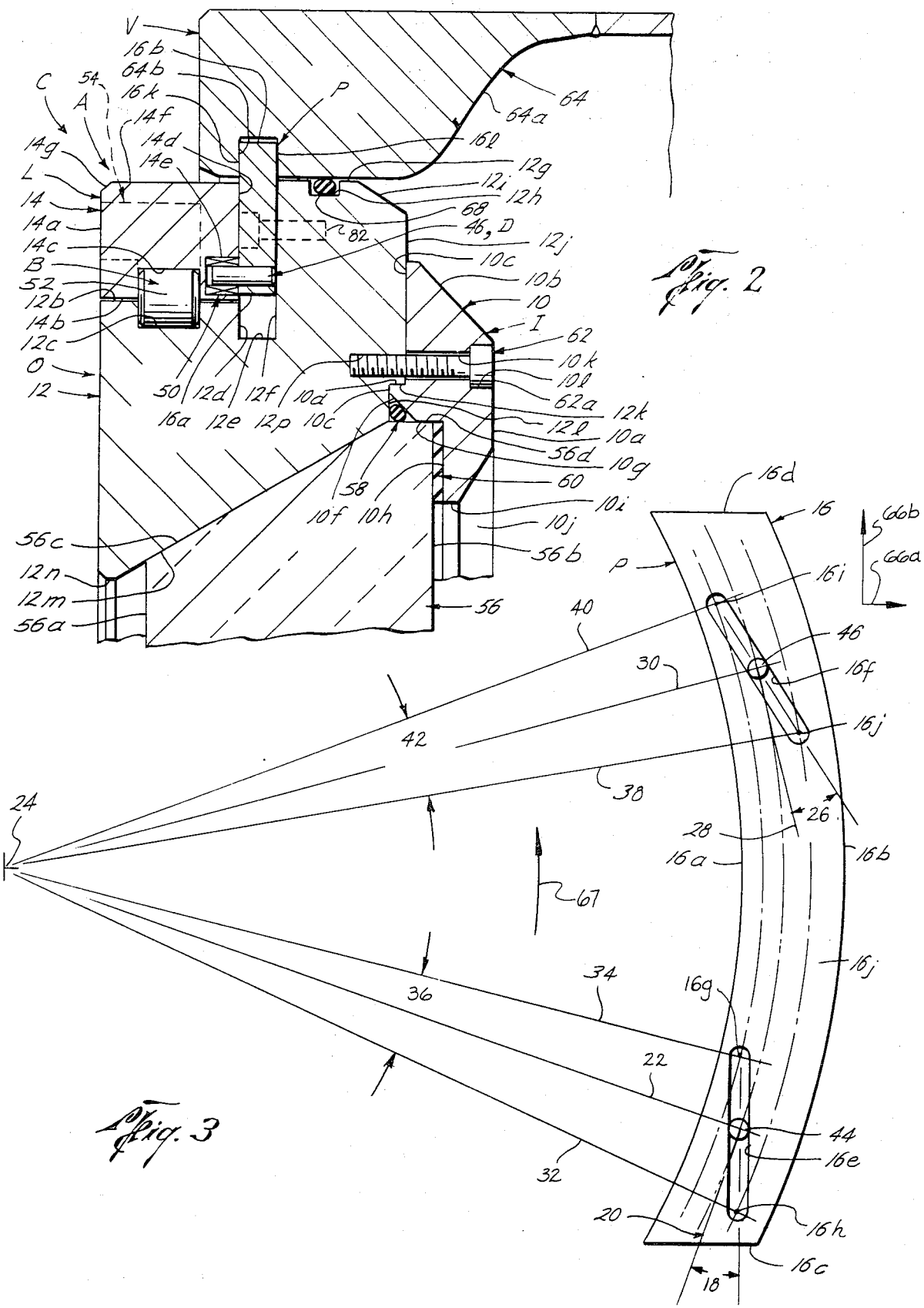

CLOSURE MEMBER FOR PRESSURE VESSEL

FIELD OF THE INVENTION

The present invention relates to closure members utilized in selectively sealing vessels capable of withstanding elevated pressures.

BACKGROUND OF THE INVENTION

Locking mechanisms for door assemblies have long been used on a wide variety of doors to a chamber and/or room that is desired to be isolated. Examples of various types of locking structures are shown in U.S. Pat. Nos. 1,269,572; 2,664,611; 4,114,933; and 4,342,207.

However, if the chamber and/or room that is to be secured requires an ability to maintain a greater pressure from within the chamber than exists outside the chamber, additional pressure related considerations must be taken into account. Such pressure vessel closure assemblies have long been known and include a wide variety of structures as shown in U.S. Pat. Nos. 2,010,200 and 3,258,151. Of the types of pressure closure assemblies for pressure vessels utilizing some type of annular or radially expanding element, some examples are shown in U.S. Pat. Nos. 2,196,895; 4,102,474 and 4,315,577. However, so far as known, all of the aforementioned pressure vessel closure members require centrally mounted and/or operated mechanisms for effectuating a radially expanding locking element. In some cases, as for example with U.S. Pat. No. 4,102,474, a central portion of a closure member is required to be maintained at a pressure in order to properly actuate particular elements thereof in order to accomplish the locking operation. In like fashion, U.S. Pat. No. 4,315,577 discloses a centrally mounted operator rotating in such a fashion that the locking elements are individually and independently moved outwardly based upon movement of a pin in a spiraling track.

Thus, so far as known, no pressure vessel closure member is available that provides an annular locking ring assembly having an unobstructed central area of a size greater than one-half the outside diameter of the closure member which permits a suitable viewport and/or other non-locking features to be incorporated with the pressure vessel closure member.

SUMMARY OF THE INVENTION

The present invention relates to a new and improved closure member for a pressure vessel having a ring assembly that has a radially expansible outside diameter and an inside diameter defining a central area, with the central area of the diameter greater than one-half the outside diameter, and with the ring assembly selectively engaging the pressure vessel between a locked position and an unlocked position.

BRIEF DESCRIPTION OF THE DRAWINGS

FIG. 2 is a sectional view of the closure member of the present invention, as taken along the lines 2—2 of FIG. 1; and, FIG. 3 is a plan view of one of the locking pawls of the present invention showing detailed angular considerations.

DESCRIPTION OF PREFERRED EMBODIMENT

Figure 1:
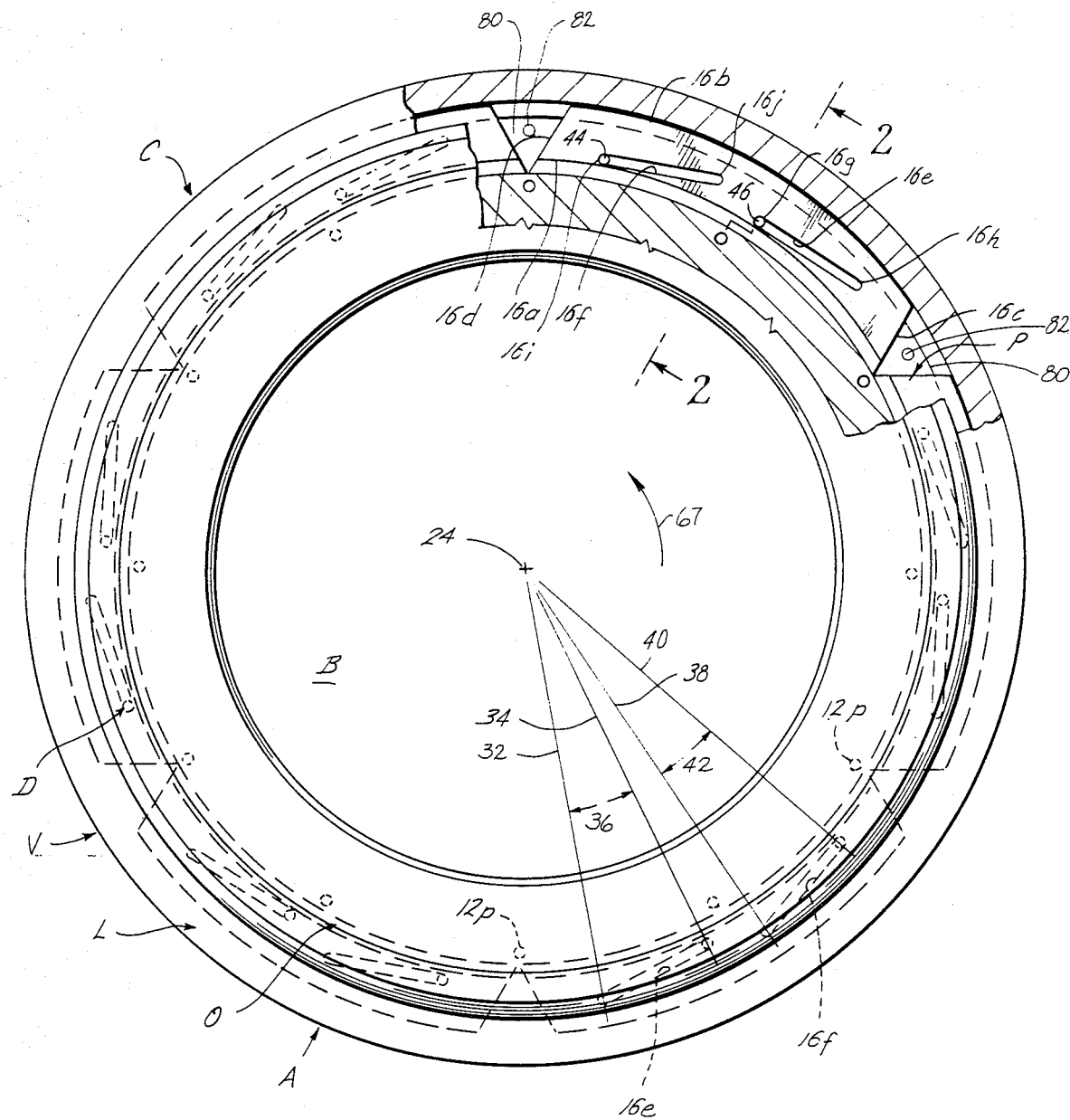
FIG. 1 is a plan view, partly in section, of the closure member of the present invention.

The closure member of the present invention is designated generally with the letter C. It is adapted to be used with a pressure vessel V. The closure member C includes generally a ring assembly A having a central area X which may accommodate a viewport B. The ring assembly A includes an inner ring I, an outer ring O, a locking ring L, and locking pawls P which are selectively movable between a locked position wherein the ring assembly A lockably engages the pressure vessel V and an unlocked position wherein the ring assembly A does not lockably engage a pressure vessel V. Unless otherwise delineated, it is preferred that the components of the closure member C of the present invention be formed of suitable materials such as stainless steel, aluminum, and the like, capable of handling the extremes in pressures typically encountered in pressure vessels V of all types.

The closure member C of the present invention includes a ring assembly A. The ring assembly A includes an inner ring I which includes ring 10. The ring 10 is formed having an inner radial surface 10a, a beveled surface 10b, an outer radial surface 10c, an annular lip 10d, a radial surface 10e, a beveled surface 10f, an annular surface 10g, a radial surface 10h, an inner annular surface 10i, and a beveled surface 10j. Preferably a suitable opening 10k is formed in the inner ring 10 extending between inner radial surface 10a and outer radial surface 10c having a suitable countersunk portion 10l adjacent thereto.

The ring assembly A of the closure member C of the present invention further includes an outer ring O which includes outer ring 12. The outer ring 12 is preferably formed having an outer radial surface 12a, an annular surface 12b, a radial detent 12c formed in the annular surface 12b, a radial surface 12d, an annular surface 12e, a radial surface 12f, an outer annular surface 12g, a radial detent 12h formed in the outer annular surface 12g, a beveled surface 12i, an inner radial surface 12j, an annular surface 12k, a radial surface 12l, a beveled surface 12m, an inner annular surface 12n, and a beveled surface 12o. As discussed below, the outer ring O may alternatively be of a solid disc or plate-like configuration, with there being no surfaces 12m, 12n.

The ring assembly A of the closure member C of the present invention further includes a locking ring L which includes locking ring 14. The locking ring 14 includes an outer radial surface 14a, an inner annular surface 14b formed having a radial detent 14c therein, an inner radial surface 14d formed having a plurality of openings 14e therein, an outer annular surface 14f and beveled surface 14g.

The ring assembly A of the closure member C further includes locking pawls P which are selectively movable between the locked position wherein the ring assembly A lockably engages the pressure vessel V and an unlocked position wherein the ring assembly A does not lockably engage the pressure vessel V. The locking pawls P include pawls 16 each of which is formed having an inner annular surface 16a, an outer annular surface 16b, a first end 16c, and a second end 16d. Each of the pawls 16 further includes preferably a first elongate slot 16e and a second elongate slot 16f. Preferably the first elongate slot 16e is formed having an inner point 16g in proximity to the inner annular surface 16a and having an outer point 16h in proximity to the outer annular surface 16b and the first end 16c. In like fashion, the second elongate slot 16f is formed with the outer point 16j adjacent the outer annular surface 16b and with the inner point 16i in proximity to the inner annular surface 16a and the second end 16d. As such, each of the slots 16e, 16f of the pawls 16 are formed extending from inner points 16g, 16i, respectively in proximity to the inner annular surface 16a to outer points 16h, 16j, respectively, in proximity to the outer annular surface 16b. Preferably the inner annular surface 16a and outer annular surface 16b are concentric with one another for forming each of the pawls 16 of the locking pawls P in a substantially arcuate configuration. The locking pawls P further includes an outer plate surface 16k and an inner plate surface 16l as best seen in FIG. 2.

As illustrated in FIG. 1, it is preferred that there be six (6) arcuately shaped locking pawls P uniformly disposed equidistant about the perimeter of said ring assembly A, with each of the locking pawls P being of substantially 60° of the 360° perimeter of the ring assembly A. It will be appreciated that any number of locking pawls P may be uniformly disposed about the perimeter of the ring assembly A, as is desired. As best seen in FIGS. 1 and 3, slot 16e is formed at an angle 18 with respect to a tangent 20 to a radial 22 intersecting the central axis 24 of the ring assembly A. In like fashion, the second elongate slot 16f is formed at an angle 26 with respect to a tangent 28 to a radial 30 intersecting the central axis 24 of the ring assembly A. As such, for the reasons set forth hereinbelow, it is preferred that the angle 26 be smaller than that of the angle 18, on each of the respective pawls 16 of the locking pawls P.

The elongate slots 16e, 16f preferably are substantially linear and of a non-arcuate configuration. Furthermore, as best seen in FIGS. 1 and 3, radials 32, 34 extending from the central axis 24 and running through points 16h, 16g, respectively, of the first elongate slot 16e form an angle 36 while radials 38, 40 extending through the central axis 24 to points 16j, 16i, respectively, of the second elongate slot 16f form an angle 42 with respect to the central axis 24. As such, it is preferred that the angle 36 be greater than that of angle 42 for the reasons set forth hereinbelow.

The ring assembly A of the present invention further includes dowel members D mounted with the locking ring L for engaging the locking pawls P as described below. The dowel members D may include dowels 44, 46 which are adapted to engage slots 16e, 16f, respectively. Furthermore, dowels 44, 46 of the dowel members D are adapted to be mounted with the locking ring L by suitable dowel bearing means 48, 50 which are adapted to be disposed in openings 14e formed in the locking ring 14. Preferably, the dowel bearing means 48, 50 may be of any suitable type bearing capable of permitting rotation of the dowels 44, 46, as such engage the slots 16e, 16f of the locking pawls P. The dowel bearing means 48, 50 rotatably mounts the dowel members 44, 46, respectively with the locking ring L.

The ring assembly A of the closure member C of the present invention further includes bearing means B disposed between inner annular surface 14b of locking ring 14 and annular surface 12b of outer ring 12 for rotationally securing the locking ring L with the outer ring O. The bearing means B includes bearings 52 which are preferably adapted to be mounted in the radial detents 12c, 14c of the outer ring 12 and locking ring 14, respectively. A suitable fill port 54 of any desired design, for example, as shown in FIG. 2, permits access to the radial detents 12c, 14c for appropriate mounting of the bearings 52 therewithin. As such, the bearings 52 of the bearing means B act to secure the locking ring L with the outer ring O.

The closure member C of the present invention may further include a viewport 56 which is adapted to be fitted within the ring assembly A such that the viewport 56 is mountable in the central area X thereof. Preferably, the viewport 56 is formed having an outer surface 56a, an inner surface 56b, an annular beveled surface 56c, annular surface 56d. While the viewport 56 may be of a suitable high strength plastic, glass or other transparent material, in the alternative the viewport 56 may be of any other suitable desirable material, whether or not such material may or may not permit viewing therethrough.

In the assembly of the closure member C of the present invention, it is contemplated that the viewport 56 be positioned such that the annular beveled surface 56c abutts compatibly formed beveled surface 12m of the outer ring 12. Thereafter, the inner ring I is positioned with surfaces 10c, 10d, 10e thereof in mating engagement with surfaces 12j, 12k, 12l, respectively, of the outer ring 12. Preferably a suitable member 58, which may be an O-ring or any other suitable sealing member, is disposed between surfaces 10f, 12l, and 56d to effect a sealing relation therebetween. Furthermore, a suitable sealing member 60 is preferably disposed between the surface 10h of the inner ring I and the inner surface 56b of the viewport 56. A suitable fastener 62 such as bolt 62a may be disposed within opening 10k and countersunk portion 10l, thereinto a suitably formed threaded opening 12p formed in the outer ring 12 for threadedly receiving the fastener 62 for securing the inner ring I with the outer ring O. It will be appreciated that a number of fasteners 62 may be used for proper connection of the inner ring I with the outer ring O.

The locking pawls P are preferably disposed between the outer ring O and locking ring L such that outer surface 16k of pawl 16 is adapted to be disposed adjacent to inner radial surface 14d of locking ring 14 and radial surface 12d of outer ring 12. The inner surface 16l of the pawls 16 is adapted to be disposed adjacent to radial surface 12f of outer ring 12. As such, the locking pawls P are uniformly movable between a retracted position and an expanded position. In the retracted position, the locking pawls P are of a minimum outside diameter (hence the ring assembly A is of a minimum diameter) such that the inner annular surface 16a of the pawls 16 is in immediate proximity to annular surface 12e of the outer ring and outer annular surface 16b is substantially aligned with outer annular surface 12g of outer ring 12 and outer annular surface 14f of locking ring 14. In this retracted position, the dowels 44, 46 are in proximity to outer points 16h, 16j, of slots 16e, 16f, respectively. When the locking pawls P are in the radially expanded position, the locking pawls P are in a maximum outside diameter configuration, as shown in FIG. 2 with the inner annular surface 16a no longer in proximity to the radial surface 12d and the outer annular surface 16b no longer aligned with annular surfaces 12g, 14f. In this expanded position, the dowels 44, 46 are in proximity to inner points 16g, 16i of slots 16e, 16f, respectively. Movement of the dowels 44, 46 in slots 16e, 16f, respectively, effectuate the movement of the locking pawls P between the retracted position and the radially expanded position as shown in FIG. 2. Guide pads 80, preferably of a generally triangular configuration, act to guide the locking pawls P during movement thereof. The guide pads 80 may be machined into or with the outer ring O adjacent surface 2f or alternatively, the guide pads 80 may be made of any type of friction reducing bearing materials, such as nylon, Teflon, or other desired materials and secured with the outer ring O by suitable fasteners 82 (which may include pins, bolts, screws, and like fasteners by way of example).

As noted hereinabove, the closure member C is adapted to be used with the pressure vessel V. The pressure vessel V includes a vessel 64 preferably formed having an opening 64a. Preferably a suitable annular shoulder or groove 64b is formed in the vessel 64 adjacent to the opening 64a and is adapted to receive the locking pawls P when such are in the radially expanded position as shown in FIG. 2. The pressure vessel V may be of any type and for any intended use.

Thus, in the use of operation of the closure member C of the present invention, it is readily seen that the locking pawls P may move between a radially expanded position wherein the locking pawls P are received in an annular shoulder or groove 64b formed in the vessel 64, for securing the ring assembly A of the closure member C with the pressure vessel V. In achieving the locking operation, it will be appreciated that the locking ring L is easily rotated in the direction of arrow 67 due to the bearing means B and dowel bearing means 48, 50 action between the outer ring O and locking pawls P, respectively. As the locking ring L is rotated in the direction of arrow 67 with respect to the outer ring O, action between the dowels 44, 46 with slots 16e, 16f of the plurality of locking pawls 16 results in a radially expanding locking pawl P which is engagable with the annular shoulder or groove 64b of the vessel 64. As a result, there is a substantially uniform radial engagement of the locking pawls P with the pressure vessel V as the locking ring L is rotated.

As noted above, it is preferred that the angle 18 be greater than the angle 26 in order to enhance the ease of rotation of the locking ring L as such is rotated from the unlocked position to a locked position. This is necessary because in order to move from a smaller circumferential diameter to that of a larger circumferential diameter, certain non-linearities must be accounted for. Specifically, it is necessary that there be an increase in radial force on the slot 16f in order to overcome increased friction force acting in the direction of force arrow 66b on second end 16d as compared to that of the first end 16c. Therefore by increasing angle 18 and decreasing angle 26, an increased radial force acting in the direction of arrow 66a in proximity to the slot 16f is generated to enhance the ability to overcome the resistive frictional forces typically encountered adjacent to second end 16d as the pawl 16 expands from a retracted to an expanded position. Furthermore, this angular difference between angles 18 and 26 is necessary due to the fact that the dowels 44, 46 of the dowel members D are on a fixed diameter which act on slots having a changing diameter as the locking pawls P respond to rotation of a locking ring L. This action also accounts for the fact that angle 42 is smaller than that of angle 36.

Alternatively, it is within the scope of the present invention that angle 26 may be greater than angle 18 and that angle 42 may be greater than angle 36 should it be desired that prealignment of the second end 16d of the locking pawls P be used for aligning the ring assembly A with pressure vessel V, by way of example. In this instance, the guide pads 80 may be of such a character to reduce the aforementioned friction-related problems.

While the closure member C of the present invention is illustrated in the drawings to move to a locked position with the pressue vessel V upon rotation in the direction of arrow 67, it should be appreciated that by adjusting the orientation of slots 16e, 16f of the locking pawls P, the direction of rotation to effectuate locking may be counter to that of arrow 67, as desired.

Thus, the closure member C of the present invention includes a ring assembly A containing the entire locking mechanism in an annular member having a virtually unobstructed central area X therein which may receive suitable members such as a viewport 56, yet unencumbered with any locking structure. As such, the ring assembly A of the present invention has a central area X of a diameter greater than one-half of the outside diameter of the ring assembly A as defined by the annular surfaces 14f and 12g. In fact, experiments have shown that a central area X of the order of magnitude of substantially 75% of the total surface area of the ring assembly A may form the central area X of the ring assembly A. The central area X, as shown, includes a viewport 56; however, the central area X may include a solid element of a circular configuration such that the outer ring O is a substantially solid, flat disc or such may further include any non-door closure mechanisms of any type mountable with the outer ring O. By way of example, it is contemplated that the central area X may accommodate mounting of viewports, interconnections to and from the pressure vessel V, reduced thickness door sections for weight reduction considerations, and interconnections between various diameter pressure vessels, and the like with the pressure vessel V.

As a result, the closure member C of the present invention is virtually as efficient as snap-ring type locking closures, yet permits easy, releasable opening of the locking pawls P when the pressure vessel V is depressurized. On the other hand, when the slightest pressure exists within the pressure vessel V (greater than the pressure outside the pressure vessel V) this results in a substantial force acting between the locking pawls P in the radially expanded position working against the groove 64b in the pressure vessel V. Sealing member 68 insures a sealing relation between the outer ring O and the opening 64a of the pressure vessel 64.

It will be appreciated that on the event that the groove 64b is formed as a shoulder (not shown), there would be no portion of the pressure vessel V adjacent inner plate surface 16l of the locking pawl L (FIG. 2); and, the sealing member 68 would be positioned between the locking ring L and vessel L yet on the opposite side of the locking pawl P (as viewed in FIG. 2) and would further require necessary seals between surfaces 12b, 14b.

Thus, the interior pressure within the pressure vessel V acts upon the substantial surface area of the locking pawls P against the annular groove 64b to prevent rotation of the locking ring R under such pressure conditions. Thus, the closure member C of the present invention provides a fail safe mechanism for preventing inadvertent opening of the closure member C when the pressure within the pressure vessel V is greater than that outside the pressure vessel V. Further, the locking ring R also insures that the locking pawls P either all engage the pressure vessel V or none engage the pressure vessel V, and thus eliminates the possibility of a partially secured door.

Thus, the closure member C of the present invention provides a new, improved mechanism for releasably securing a door member with a pressure vessel V.

The foregoing disclosure and description of the invention are illustrative and explanatory thereof, and various changes in the size, shape and materials, as well as in the details of the illustrated construction may be made without departing from the spirit of the invention.

I claim:

1. A closure member for a pressure vessel, comprising:
    a ring assembly having an outside diameter and an inside diameter, said outside diameter being radially expansible and said inside diameter, defining a central area, said central area of a diameter greater than one-half said outside diameter;
    said ring assembly selectively movable between a locked position wherein said ring assembly lockably engages the pressure vessel with said radially expansible outside diameter and an unlocked position wherein said ring assembly does not lockably engage the pressure vessel;
    said ring assembly further includes:
        a plurality of locking pawls maintained in a spaced relation to each other uniformly movable independently of each other between a retracted position wherein said locking pawls are of a minimum outside diameter permitting said unlocked position and an expanded position wherein said locking pawls are radially expanded into a maximum outside diameter in engagement with the pressure vessel to secure said ring assembly with the pressure vessel in said locked position;
        each of said locking pawls having an inner annular surface, an outer annular surface, a first end, and a second end; and
        each of said locking pawls having at least two elongate slots formed extending from an inner point proximate to said inner annular surface to an outer point proximate to said outer annualr surface, said first elongate slot adjacent said first end of said locking pawl at a different angle with respect to a tangent to a radial intersecting the central axis of said ring assembly than said second said elongate slot on said locking pawl.

2. The closure member of claim 1, further including: a view port mountable in said central area.

3. The closure member of claim 1, wherein:
    said first elongate slot formed with said outer point adjacent said first end in said outer annular surface;
    said second elongate slot formed with said inner point adjacent said second end and said inner annular surface; and,
    said angle of said first elongate slot is greater than said angle of said second elongate slot.

4. The closure member of claim 1, wherein:
    said first elongate slot formed with said outer point adjacent said first end and said outer annular surface;
    said second elongate slot formed with said inner point adjacent said second end and said inner annular surface; and
    said angle of said first elongate slot is smaller than said angle of said second elongate slot.

5. The closure member of claim 1, wherein:
    said first elongate slot formed with said outer point adjacent said first end and said outer annular surface;
    said second elongate slot formed with said inner point adjacent said second end and said innder annular surface; and
    said angle of said first elongate slot is equal to said angle of said second elongate slot.

6. The closure member of claim 1, wherein:
    said elongate slot is substantially linear and non-arcuate.

7. The closure member of claim 1, wherein:
    each of said locking pawls has said inner annular surface and said outer annular surface substantially concentric to one another for forming each of said locking pawls in a substantially arcuate configuration.

8. The closure member of claim 1, wherein said locking pawls further include:
    six arcuately shaped locking pawls uniformly disposed equidistant about the perimeter of said ring assembly.

9. The closure member of claim 1, wherein said ring assembly includes:
    an inner ring adapted to be removably mounted with the pressure vessel;
    an outer ring mounted with said inner ring;
    a locking ring disposed between said inner ring and said outer ring for rotational movement; and,
    said locking pawls disposed between said locking ring and said inner ring.

10. The closure member of claim 9, wherein said ring assembly further includes:
    dowel members mounted with said locking ring, each one of said dowel members engaging one of said slots in said locking pawls for independent movement of each said locking pawl in a spaced relation to an adjacent locking pawl between said retracted position and said expanded position upon rotation of said locking ring.

11. The closure member of claim 10, wherein said ring assembly further includes:
    dowel bearing means for rotatively mounting said dowel members with said locking ring, said dowel bearing means mounted with said locking ring in bearing openings formed in said locking ring.

12. The closure member of claim 9, wherein said ring assembly further includes:
    bearing means disposed between an inner annular surface of said locking ring and an annular surface of said outer ring for rotationally securing said locking ring with the said outer ring.

13. The closure member of claim 12, wherein said ring assembly further includes:
    a fill port formed with said ring assembly for permitting said bearing means to be properly positioned between said outer ring and said locking ring.

14. The closure member of claim 1, wherein the pressure vessel is formed having an annular groove adjacent an opening thereof, wherein:
    said locking pawls are adapted to be received in the annular groove of the pressure vessel upon movement of said locking pawls from said retracted position to said expanded position.

15. The closure member of claim 1, wherein:
    said ring assembly bears the pressure loads of the pressure vessel when said ring assembly is in said locked position and pressure exists within the pressure vessel.

* * * * *